US012770022B2

(12) United States Patent
Kim

(10) Patent No.: US 12,770,022 B2
(45) Date of Patent: Oct. 20, 2026

(54) METHOD AND DEVICE FOR PREDICTING AND CONTROLLING TIME SERIES DATA BASED ON AUTOMATIC LEARNING

(71) Applicant: INEEJI Co., Ltd., Seongnam-si (KR)

(72) Inventor: Song Hwan Kim, Gyeonggi-do (KR)

( * ) Notice: Subject to any disclaimer, the term of this patent is extended or adjusted under 35 U.S.C. 154(b) by 968 days.

(21) Appl. No.: 17/773,877

(22) PCT Filed: Dec. 28, 2021

(86) PCT No.: PCT/KR2021/020067
§ 371 (c)(1),
(2) Date: May 3, 2022

(87) PCT Pub. No.: WO2022/145981
PCT Pub. Date: Jul. 7, 2022

(65) Prior Publication Data

US 2023/0162050 A1 May 25, 2023

(30) Foreign Application Priority Data

Dec. 29, 2020 (KR) ........................ 10-2020-0185683

(51) Int. Cl.
*G06N 5/022* (2023.01)

(52) U.S. Cl.
CPC .................................... *G06N 5/022* (2013.01)

(58) Field of Classification Search
CPC ..... G06N 5/022; G06N 20/20; G06F 2123/02
See application file for complete search history.

(56) References Cited

U.S. PATENT DOCUMENTS

2006/0184329 A1* 8/2006 Rowan ................... G01V 11/00 702/50
2007/0143197 A1* 6/2007 Ineke ..................... G06Q 40/06 705/36 R (Continued)

FOREIGN PATENT DOCUMENTS

JP 2000-122992 4/2000
JP 2004-86896 3/2004

(Continued)

OTHER PUBLICATIONS

Miah, "Algorithms - Min and Max," 2017, https://medium.com/killingmeswiftly/algorithms-min-and-max-31917295f6b0 (Year: 2017).*

(Continued)

*Primary Examiner* — Michael J Huntley
*Assistant Examiner* — Vincent Anton Spraul
(74) *Attorney, Agent, or Firm* — USX IP LLC

(57) ABSTRACT

A method and device for predicting and controlling time series data based on automatic learning are disclosed. According to an example embodiment, the method of predicting and controlling the time series data based on automatic learning includes training a plurality of time series data prediction models according to conditions respective for the models, determining, among the trained time series data prediction models, one or more optimal models that meet a predetermined condition, and generating a final model by combining the one or more optimal models, wherein the plurality of time series data prediction models includes at least one of statistical-based prediction models and deep learning-based prediction models.

7 Claims, 6 Drawing Sheets

(56) References Cited

U.S. PATENT DOCUMENTS

| | | | | |
|---|---|---|---|---|
| 2012/0101654 | A1* | 4/2012 | Samples | G08G 1/147 701/1 |
| 2015/0112900 | A1* | 4/2015 | Ariyoshi | G06N 20/00 706/46 |
| 2015/0212974 | A1* | 7/2015 | Wood, III | G06F 17/18 703/2 |
| 2017/0003676 | A1* | 1/2017 | Yoshida | G05B 19/4183 |
| 2018/0025288 | A1* | 1/2018 | Piche | G05B 13/0265 706/46 |
| 2018/0060738 | A1* | 3/2018 | Achin | G06N 20/00 |
| 2020/0183338 | A1* | 6/2020 | Tange | G06N 3/088 |
| 2021/0048016 | A1* | 2/2021 | Bromfield | F04B 49/065 |
| 2021/0117869 | A1* | 4/2021 | Plumbley | G06F 18/217 |

FOREIGN PATENT DOCUMENTS

| | | |
|---|---|---|
| JP | 2017-520068 | 7/2017 |
| KR | 10-2017-0078256 | 7/2017 |
| KR | 10-2037279 | 11/2019 |
| KR | 10-2041545 | 11/2019 |
| KR | 10-2020-0014510 | 2/2020 |
| KR | 10-2020-0017604 | 2/2020 |

OTHER PUBLICATIONS

Taylor et al. "Forecasting at Scale", The American Statistician, 72(1): 37-45, Published Online Sep. 27, 2017.

* cited by examiner

METHOD AND DEVICE FOR PREDICTING AND CONTROLLING TIME SERIES DATA BASED ON AUTOMATIC LEARNING

RELATED APPLICATIONS

This application is a National Phase of PCT Patent Application No. PCT/KR2021/020067 having International filing date of Dec. 28, 2021, which claims the benefit of priority of Korea Patent Application No. 10-2020-0185683 filed on Dec. 29, 2020. The contents of the above applications are all incorporated by reference as if fully set forth herein in their entirety.

FIELD AND BACKGROUND OF THE INVENTION

The following description relates to a method and device for predicting and controlling time series data based on automatic learning, and more particularly, to an automatic learning-based artificial intelligence learning and verifying technique that may precisely predict future only with an appropriate amount of training time series data.

In fields such as finance and manufacturing, people often have to recognize changes in time series and sequential data and make appropriate judgments. For example, a professional investor in a securities company monitors changes in market values such as exchange rates and interest rates and predicts timing and amount of investment, and an operator of factory equipment checks temperature, pressure, and flow rate information and predicts the conditions of the facilities to perform optimal control. However, since analysis of the time series data such as stocks and exchange rates involves complex factors, it is difficult to pinpoint which factors have an effect.

Recent advances in artificial intelligence technology have shown superior prediction performance compared to traditional statistical analysis in forecasting. However, the existing artificial intelligence model has a problem in that the model trained based on data lacks retraining over time, and accordingly the consistency thereof decreases over time. In addition, the existing artificial intelligence model focuses only on the diagnosis of abnormal data, so it is not suitable for automatically learning and providing optimized facility control and investment techniques.

SUMMARY OF THE INVENTION

Example embodiments are not only to perform learning and prediction based on a machine learning model, but also to select an optimal model by automatically learning a deep learning model.

The example embodiments are to provide an automatic learning function for optimally controlling a target variable.

The example embodiments are to provide a description of deep learning model training and a time series deep learning model.

Technical goals of the present disclosure are not limited to what is described in the foregoing, and other technical goals that are not described above may also be clearly understood by those skilled in the art from the following description.

According to an aspect, there is provided a method of predicting and controlling time series data based on automatic learning, the method including training a plurality of time series data prediction models according to conditions for the respective models, determining, among the trained time series data prediction models, one or more optimal models that meet a predetermined condition, and generating a final model by combining the one or more optimal models, wherein the plurality of time series data prediction models includes at least one of statistical-based prediction models and deep learning-based prediction models.

The method may further include receiving target variable data for predicting time series data, inputting the target variable data to the final model and outputting target variable prediction data that corresponds to the target variable data.

The method may further include receiving control variable data that determines a direction of a change in the target variable prediction data, inputting the control variable data to the final model and outputting control variable prediction data that corresponds to the control variable data.

The method may further include providing a prediction result and a control method of the time series data based on the target variable prediction data and the control variable prediction data.

The method may further include adjusting the control variable data based on a correlation between the target variable prediction data and the control variable prediction data.

The adjusting of the control variable data may include training a reinforcement learning model according to a reward function that is determined based on the target variable prediction data and the control variable prediction data.

The outputting of the control variable prediction data may include determining a moving direction of the control variable data, and determining an optimal search time for the control variable data.

The outputting of the target variable prediction data may include outputting the target variable prediction data based on the moving direction and the optimal search time for the control variable data.

The training may include training the plurality of time series data prediction models a predetermined number of times according to the conditions for the respective models.

The method may further include evaluating prediction performance of the final model, updating the final model, when the prediction performance of the final model decreases below a predetermined threshold.

The method may further include updating the final model according to a predetermined interval.

According to another aspect, there is provided a device for predicting and controlling time series data based on automatic learning, the device including a processor configured to train a plurality of time series data prediction models according to conditions for the respective models, determine, among the trained time series prediction models, one or more optimal models that meet a predetermined condition, and generate a final model by combining the one or more optimal models, wherein the plurality of time series data prediction models includes at least one of statistical-based prediction models and deep learning-based prediction models.

The processor may be further configured to receive target variable data for predicting time series data, input the target variable data to the final model, and output target variable prediction data that corresponds to the target variable data.

The processor may be further configured to receive control variable data that determines a direction of a change in the target variable prediction data, input the control variable data to the final model, and output control variable prediction data that corresponds to the control variable data.

The processor may be further configured to provide a prediction result and a control method for the time series data based on the target variable prediction data and the control variable prediction data.

The processor may be further configured to adjust the control variable data based on a correlation between the target variable prediction data and the control variable prediction data.

The processor may be further configured to train a reinforcement learning model according to a reward function that is determined based on the target variable prediction data and the control variable prediction data.

The processor may be further configured to train the plurality of time series data prediction models a predetermined number of times according to the conditions for the respective models.

The processor may be further configured to evaluate prediction performance of the final model and update the final model when the prediction performance of the final model decreases below a predetermined threshold.

The processor may be further configured to update the final model according to a predetermined interval.

Example embodiments may not only perform learning and prediction based on a machine learning model but also select an optimal model by automatically learning a deep learning model.

The example embodiments may provide an automatic learning function for optimally controlling a target variable.

The example embodiments may provide a description of deep learning model learning and a time series deep learning model.

Effects of the present disclosure are not limited to what is described in the foregoing, and other effects that are not described above may also be clearly understood by those skilled in the art from the scope of the claims.

DESCRIPTION OF SPECIFIC EMBODIMENTS OF THE INVENTION

Figure 1:
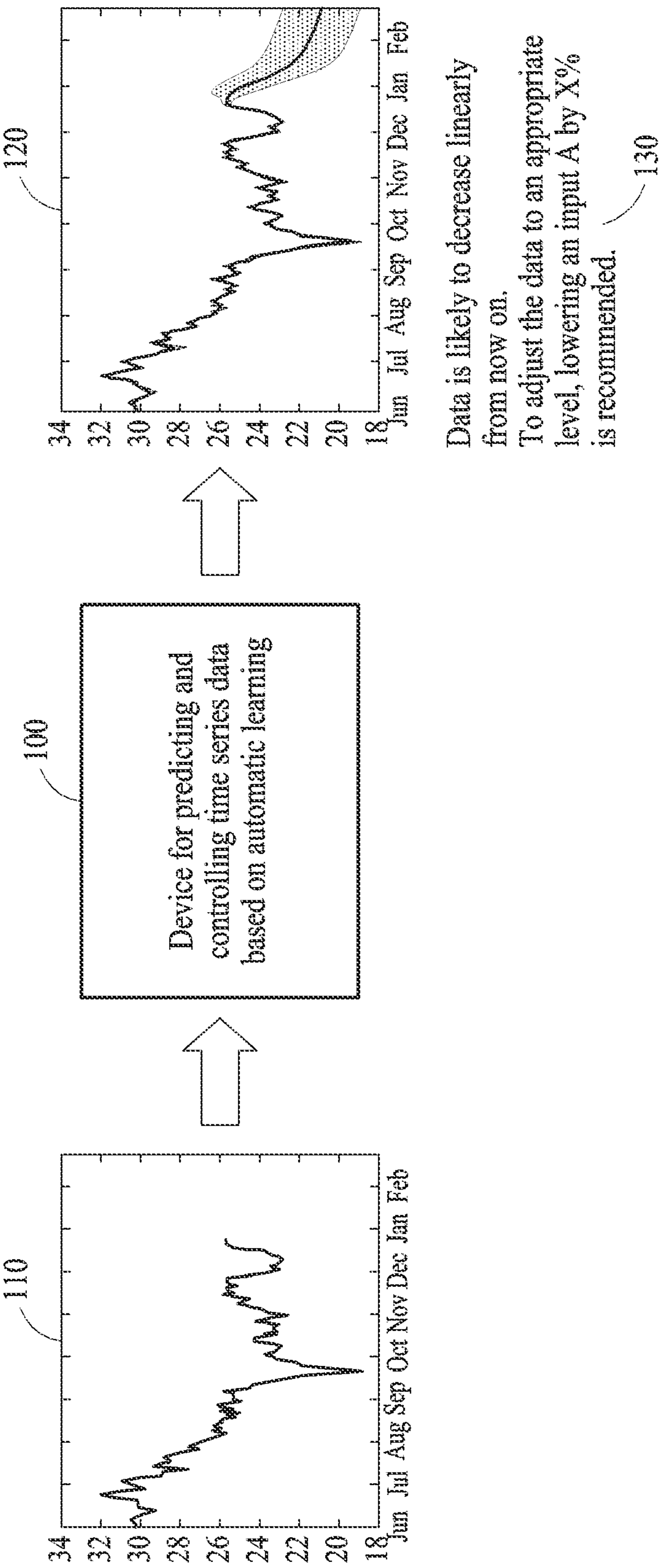
FIG. 1 is a diagram illustrating a method of predicting and controlling time series data based on automatic learning according to an example embodiment.

The following structural or functional descriptions are exemplary to merely describe the example embodiments, and the scope of the example embodiments is not limited to the descriptions provided in the present specification.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The example embodiments may be implemented as various types of products, such as, for example, a personal computer (PC), a laptop computer, a tablet computer, a smartphone, a television (TV), a smart home appliance, an intelligent vehicle, a kiosk, and a wearable device. Hereinafter, example embodiments will be described in detail with reference to the accompanying drawings. In the drawings, like reference numerals are used for like elements.

FIG. 1 is a diagram illustrating a method of predicting and controlling time series data based on automatic learning according to an example embodiment.

Since analysis of time series data such as stocks and exchange rates involves complex factors, it is difficult to pinpoint which factors have an effect on the analysis. Recent advances in artificial intelligence technology have shown superior prediction performance compared to traditional statistical analysis in forecasting. Specifically, a deep learning technology may accurately recognize various behavior patterns of a user appearing in an image and signal big data to be comparable to humans. An artificial intelligence model based on the deep learning technology may make more accurate predictions than humans by recognizing patterns of a personalized user with a cognitive function comparable to that of humans. However, for accurate learning, it is necessary to compare accuracy with numerous artificial intelligence (e.g., machine learning and deep learning) models.

According to an example embodiment, a device for predicting and controlling time series data based on automatic learning (hereinafter referred to as a control and prediction device) 100 may provide prediction, automatic control, and description services based on federated learning that is a combination of advantages of various artificial intelligence technologies.

Referring to FIG. 1, a control and prediction device 250 may receive input time series data 110 and output prediction time series data 120 that corresponds to the input time series data 110. Furthermore, the control and prediction device 250 may output a prediction description 130 that includes at least one of a time series prediction result, a reason for the prediction, and an optimal control suggestion together with the prediction time series data 120.

For example, the control and prediction device 250 may output the prediction description 130 that includes the time series prediction result saying "Data is likely to decrease linearly from now on." and the optimal control suggestion saying "To adjust the data to an appropriate level, lowering an input A by X % is recommended." together with the prediction time series data 120.

Figure 2:
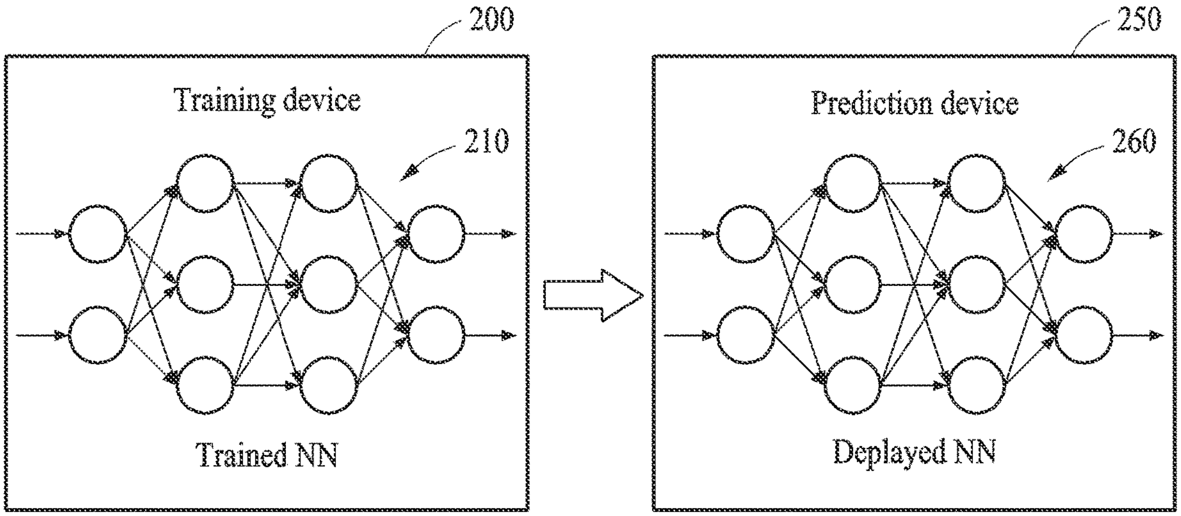
FIG. 2 is a diagram illustrating a relationship between a training device and a prediction device according to an example embodiment.

FIG. 2 is a diagram illustrating a relationship between a training device and a prediction device according to an example embodiment.

Referring to FIG. 2, a training device 200 may correspond to a computing device having various processing functions, for example, functions of generating a neural network, training (or learning) a neural network, or retraining a neural network. For example, the training device 200 may be implemented as various types of devices, for example, a personal computer (PC), a server device, or a mobile device.

The training device 200 may generate a trained neural network 210 by repetitively training (or learning) a given initial neural network. Generating of the trained neural network 210 may refer to determining neural network parameters. Here, the parameters may include various types of data, for example, input/output activations, weights, and biases that are input to and output from the neural network. When the neural network is repetitively trained, the parameters of the neural network may be tuned to calculate a more accurate output for a given input.

The training device 250 may transmit the trained neural network 210 to a prediction device 250. The prediction device 250 may be included in a mobile device or an embedded device. The prediction device 250 may be dedicated hardware for operating the neural network.

The prediction device 250 may operate the trained neural network 210 without a change, or may operate a neural network 260 obtained by processing (for example, quantizing) the trained neural network 210. The prediction device 250 for operating the processed neural network 160 may be implemented in a separate device independent of the generative model training device 200. However, example embodiments are not limited thereto, and the prediction device 250 and the training device 200 may also be implemented in a same device. Hereinafter, a device including both the prediction device 250 and the training device 200 will be referred to as an artificial intelligence device.

Figure 3:
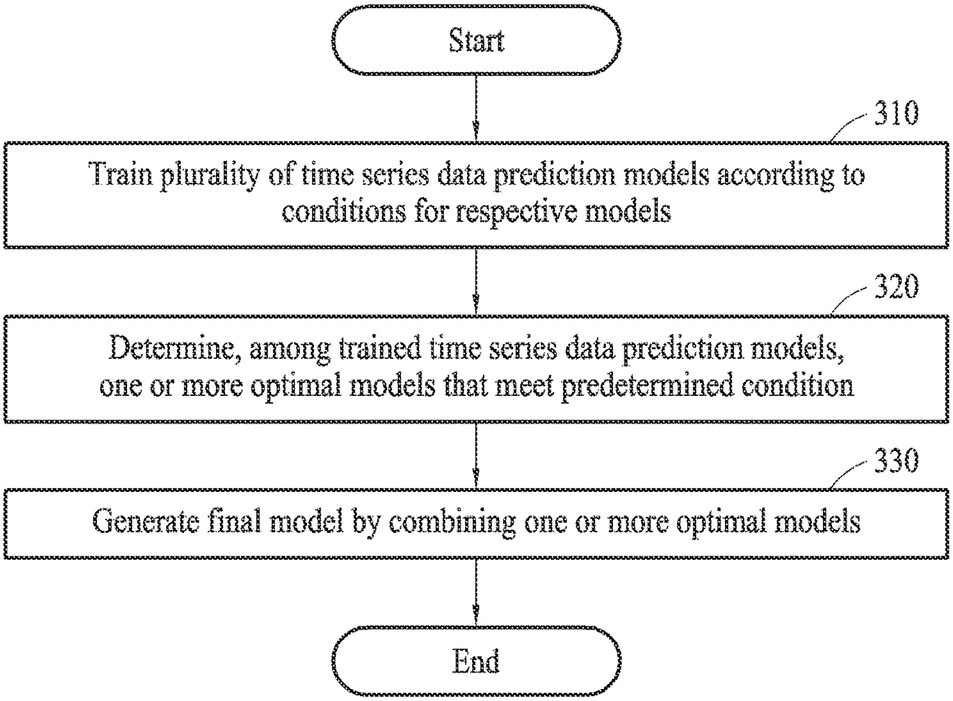
FIG. 3 is a diagram illustrating a method of predicting and controlling time series data based on automatic learning according to an example embodiment.

FIG. 3 is a diagram illustrating a method of predicting and controlling time series data based on automatic learning according to an example embodiment.

Referring to FIG. 3, operations 310 to 330 may be performed by the training device described above with reference to FIG. 2. The training device may be implemented by one or more hardware modules, one or more software modules, or various combinations thereof. Furthermore, the operations of FIG. 3 may be performed in a shown order and manner. However, the order of some operations may be changed, or some operations may be omitted, without departing from the spirit and scope of the example embodiment shown in FIG. 3. The operations in FIG. 3 may be performed in parallel or simultaneously.

In operation 310, the training device trains a plurality of time series data prediction models according to conditions for the respective models. The training device may train the models a predetermined number of times (e.g., three times) under the different conditions for the respective models.

In operation 320, the training device determines, among trained time series data prediction models, one or more optimal models that meet a predetermined condition. For example, the training device may determine, among the plurality of time series data prediction models, top three models of which prediction performance is good and does not significantly change according to a model change as optimal models.

In operation 330, the training device generates a final model by combining the one or more optimal models.

When given prediction performance decreases or a specific interval passes after training, operations 310 to 330 may be automatically repeated. For example, the training device may evaluate prediction performance of the final model, and when the prediction performance of the final model decreases below a predetermined threshold, the training device may repeat operations 310 to 330 to update the final model. Alternatively, the training device may update the final model according to a predetermined interval.

Figure 4:
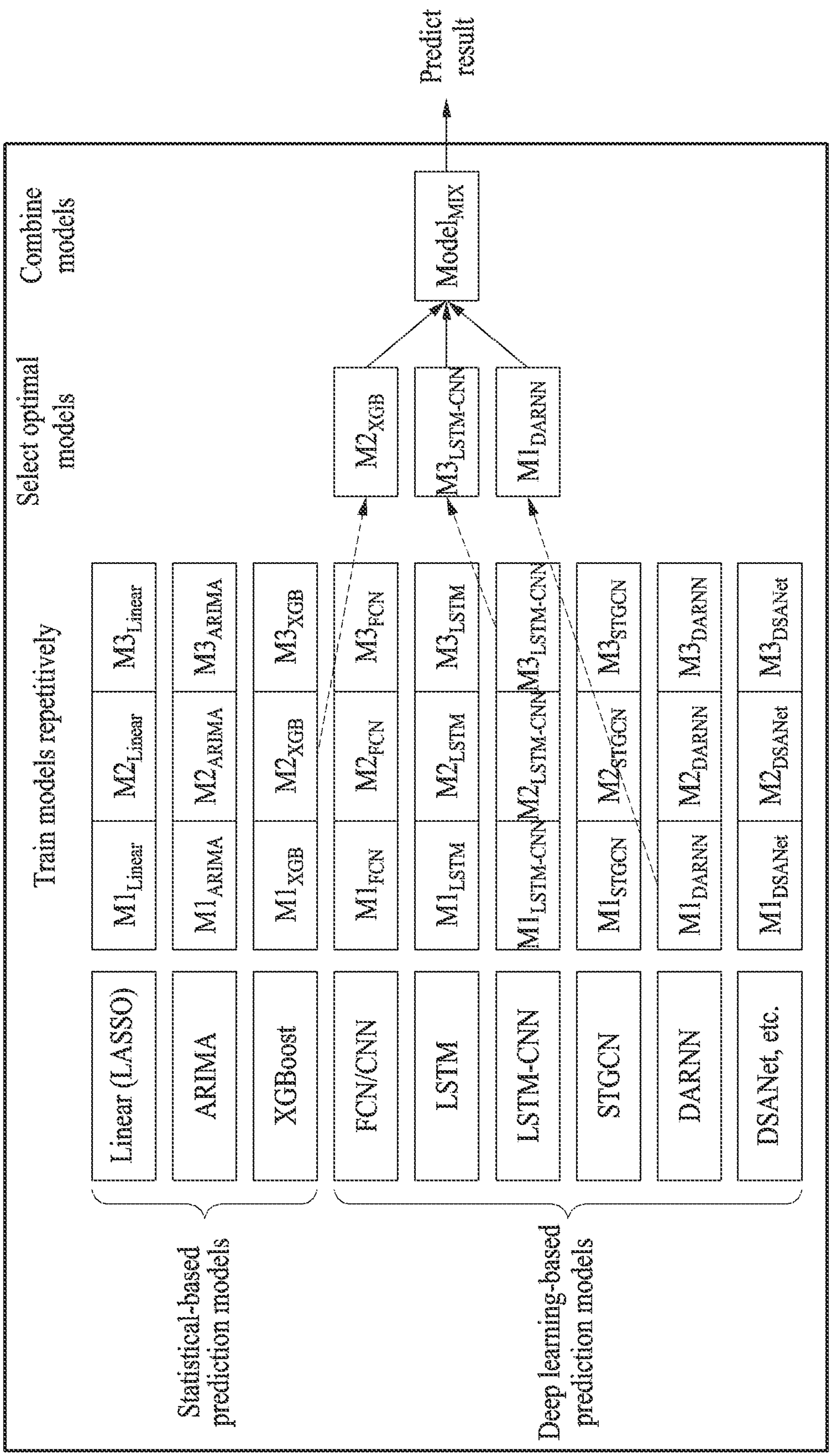
FIG. 4 is a diagram illustrating a training method according to an example embodiment.

FIG. 4 is a diagram illustrating a training method according to an example embodiment.

Referring to FIG. 4, a training device may train a plurality of time series data prediction models according to conditions for the respective models.

The plurality of time series data prediction models may include at least one of statistical-based prediction models and deep learning-based prediction models. For example, the statistical-based prediction models may include LASSO, ARIMA, XGBoost, and the like, and the deep learning-based prediction models may include FCN/CNN, LSTM, LSTM-CNN, STGCN, DARNN, DSANet, and the like. However, the above-described plurality of time series data prediction models is exemplary to merely describe the example embodiments according to technical concepts, and the plurality of time series data prediction models may include various different models and are not limited to the examples described in the present specification.

The training device may train each of the plurality of time series data prediction models three times and may determine an optimal model among the trained models. For example, the training device may determine $M2_{XGB}$, which is a second trained model among XGBoost models, as a first optimal model, $M3_{LSTM\text{-}CNN}$, which is a third trained model among LSTM-CNN models, as a second optimal model, and $M1_{DARNN}$, which is a first trained model among DARNN models, as a third optimal model.

Furthermore, the training device may generate a final model (e.g., $Model_{MIX}$) by combining $M2_{XGB}$, $M3_{LSTM\text{-}CNN}$, and $M1_{DARNN}$. When the final model is generated, a prediction device may use the final model that is optimally trained and stored to provide a predicted value for input data in real time without retraining. A detailed method of predicting and controlling time series data will be described below with reference to FIGS. 5A to 5B.

Figure 5A:
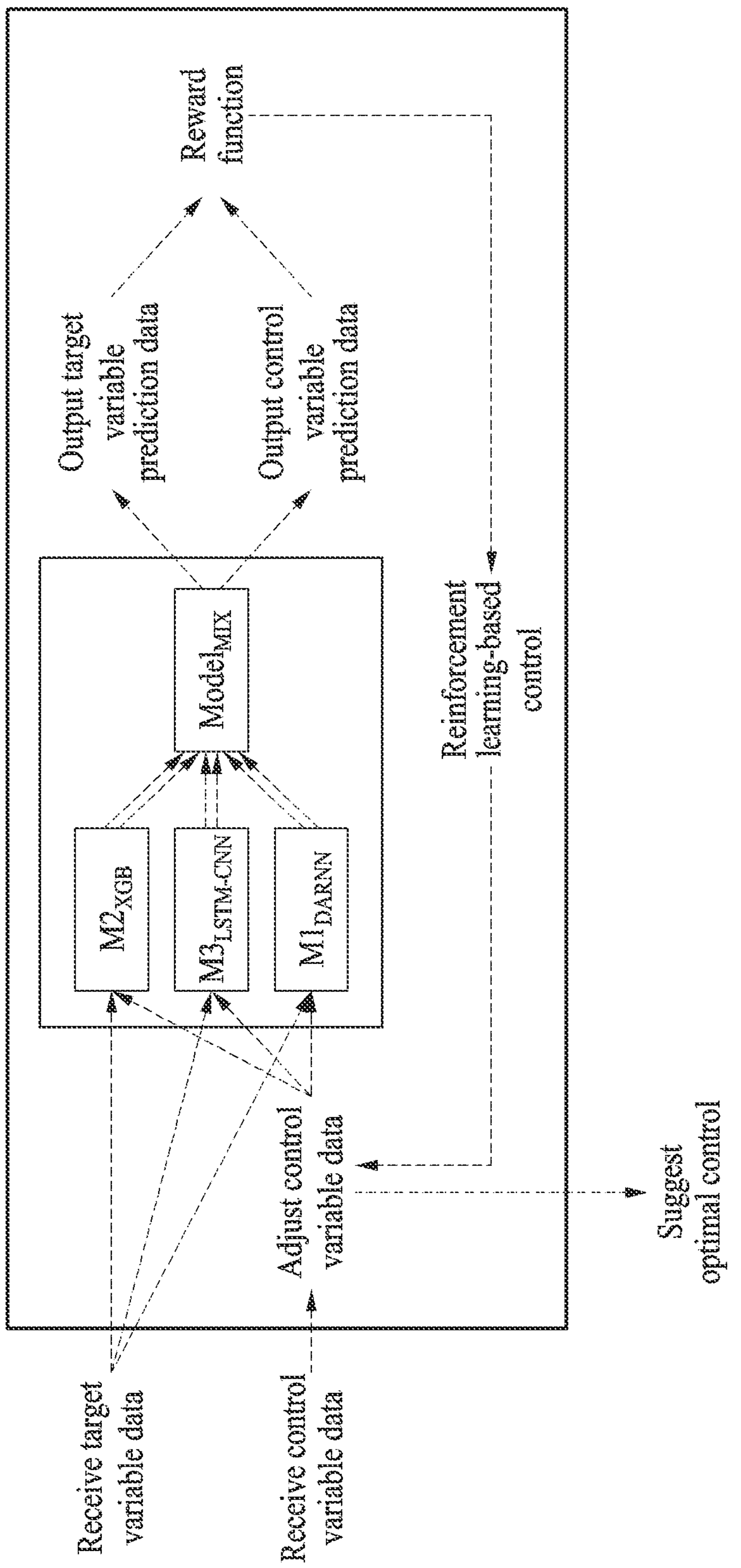
FIGS. 5A and 5B are diagrams illustrating a method of predicting and controlling time series data according to an example embodiment.

FIG. 5A is a diagram illustrating a method of predicting and controlling time series data according to an example embodiment.

Referring to FIG. 5A, a prediction device may receive a final model from a training device. However, as described above, the prediction device and the training device may be implemented in a same device.

The prediction device may receive target variable data for predicting the time series data. Furthermore, the prediction device may input the target variable data to the final model and output target variable prediction data that corresponds to the target variable data. The target variable data may be input time series data to be predicted, and the prediction target variable data may be predicted data that corresponds to the target variable data. The target variable data may be, for example, process yield data or return on investment data over time.

The prediction device may receive control variable data that determines a direction of a change in the target variable prediction data. Furthermore, the prediction device may input the control variable data to the final model and output control variable prediction data that corresponds to the control variable data. The control variable data may be data that determines a direction of a change in the target variable prediction data. For example, if target data is return on investment data, the control variable data may be international oil price data or exchange rate data that may affect the return on investment data.

The prediction device may provide a prediction result and a control method of the time series data based on the target variable prediction data and the control variable prediction data. The prediction device may adjust the control variable data based on a correlation between the target variable prediction data and the control variable prediction data. As an example, the prediction device may train a reinforcement learning model according to a reward function that is determined based on the target variable prediction data and the control variable prediction data.

Figure 5B:
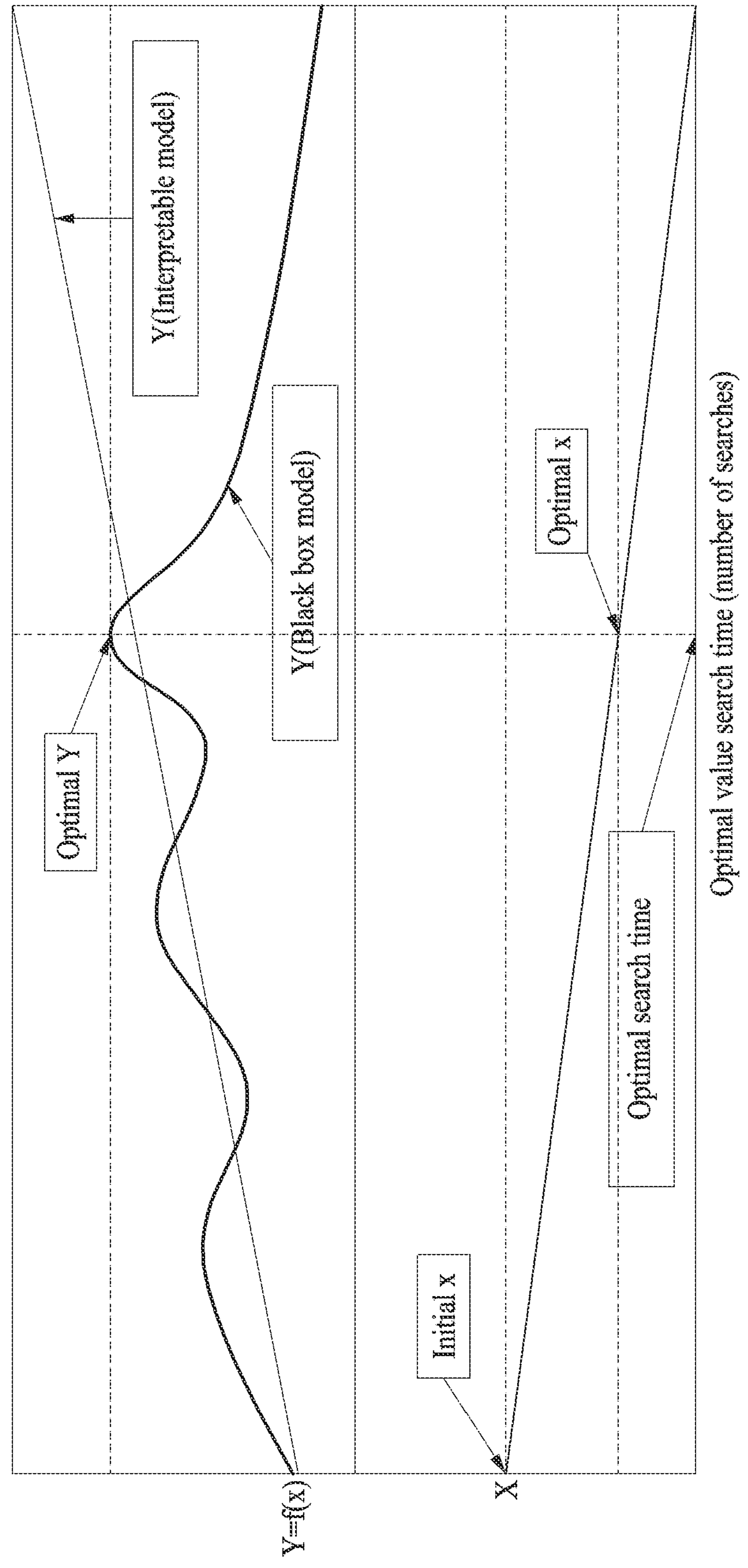

For example, the prediction device may adjust a control variable based on an optimal prediction model to determine the direction of the change in the target variable data such as process yield and production improvement, a return on investment increase, and a stability increase, and learn control variable data that optimizes the same through the reinforcement learning. Furthermore, the prediction device may provide a user with an adjustment direction of the optimized control variable. With reference to FIG. 5B below, a guide method will be described in more detail.

Referring to FIG. 5B, the prediction device may guide the user on an optimal value search direction and an optimal value search time of control variables (e.g., process parameters or process independent variables). That is, variables of an optimization function may be an optimization target parameter Y, process parameters ($x_1, x_2, \ldots, x_n$), and the optimal value search time (or a number of searches).

The prediction device may further include a black box model as well as the final model. The black box model may be a model that outputs a result value corresponding to independent variables. The final model may be used to predict the result value, and the black box model may be used to determine an optimal search time and an optimal value based on an optimal value search result predicted by the final model.

More particularly, the prediction device may have to select a moving direction (e.g., increasing or decreasing) from the origin (e.g., an initial x) of process independent variables to search a process optimal value. For example, the prediction device may determine the moving direction according to a correlation (e.g., a gradient) between the independent variables and a dependent variable y that the final model (e.g., an interpretable model) learned. For example, the prediction device may search the process independent variables one time ($x_t=x_{t-1}+dx$) in an arbitrary direction from the origin and then, store a corresponding search value and perform a next optimal value search when a response ($y_t=f(x_t)$) of the interpretable model is improved ($y_t>y_{t-1}$), or dismiss the corresponding search value and return the independent variables to a previous position ($x_{t-1}$) when the response is not improved.

The prediction device may input the stored optimal value search result ($x_t$) to the black box model when a preset search end time is reached. The prediction device may find a search time (a number of searches) at which a response of the black box model is optimal (argmax f(x)) to determine the corresponding time as the optimal search time and determine the optimal value search result at the optimal search time as a guide (an optimal x). Thus, this is a system capable of providing an accurate process guide and a description thereof.

Figure 6:
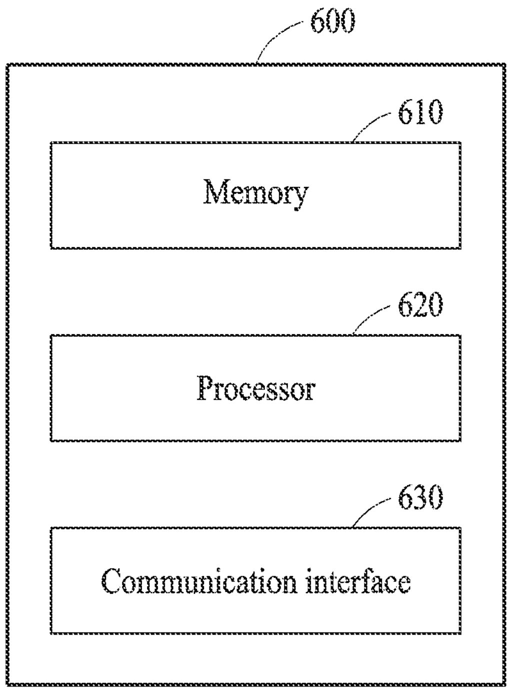
FIG. 6 is a block diagram of an artificial intelligence device according to an example embodiment.

FIG. 6 is a block diagram of an artificial intelligence device according to an example embodiment.

Referring to FIG. 6, an artificial intelligence device includes a processor 610. The artificial intelligence device 600 may further include a communication interface 630 and a memory 620. The processor 610, the memory 620, and the communication interface may communicate with each other via a communication bus.

The processor 610 may train a plurality of time series data prediction models according to conditions for the respective models, determine, among the trained time series data prediction models, one or more optimal models that meet a predetermined condition, and generate a final model by combining the one or more optimal models.

The memory 620 may store a variety of information generated during the processing process of the processor 610. In addition, the memory 620 may store various data and programs. The memory 620 may include a volatile memory or a non-volatile memory. The memory 620 may include a large-capacity storage medium such as a hard disk to store the various data.

In addition, the processor 610 may perform the at least one method described above with reference to FIGS. 1 to 5 or an algorithm corresponding to the at least one method. The processor 610 may execute a program and control the artificial intelligence device 600. A program code to be executed by the processor 610 may be stored in the memory 620. The artificial intelligence device 600 may be connected to an external device (e.g., a PC or a network) through an input/output device (not shown) to exchange data therewith.

The examples described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A method of predicting, controlling, and describing time series data based on automatic learning, the method performed by an electronic device comprising a memory storing computer-readable instructions and a hardware processor configured to execute the instructions to perform the method comprising:

training a plurality of time series data prediction models according to conditions for the respective models;

determining optimal models among the trained time series data prediction models, wherein each of the optimal models meets a predetermined condition;

generating a final model by combining the optimal models;

receiving target variable data for predicting time series data, inputting the target variable data to the final model, and generating target variable prediction data corresponding to the target variable data by using the final model;

receiving control variable data, inputting the control variable data to the final model, and generating control variable prediction data corresponding to the control variable data by using the final model, wherein the target variable data includes at least one of data of process yield and data of return on investment over time, and the control variable data is data that determines a direction of a change in the target variable prediction data; and providing a prediction result and a control method for the time series data based on the target variable prediction data and the control variable prediction data, wherein the plurality of time series data prediction models comprise at least one of statistical-based prediction models and deep learning-based prediction models, and wherein the providing of the prediction result and the control method for the time series data comprises:

determining a direction of a change in the target variable data, wherein the direction of the change in the target variable data is determined to indicate an increase of the process yield or the return on investment, learning control variable data for optimizing the target variable data according to the determined direction of change in the target variable data, and providing a user with an adjustment direction of the optimized control variable data, and wherein the adjustment direction of the optimized control variable data includes an optimal value search direction and an optimal search time for the control variable data, wherein the electronic device further comprises a black box model configured to output a result value corresponding to independent variables that are the control variable data, and wherein the providing of the user with the adjustment direction of the optimized control variable data comprises:

selecting a moving direction from an origin of the independent variables according to a correlation between the independent variables and a dependent variable that the final model learned, wherein the selecting of the moving direction comprises (i) obtaining a search value by searching the independent variables in an arbitrary direction from the origin, (ii) when a response of the final model is improved in the search value, storing the search value and proceeding with conducting a search for a next optimal value, and (iii) when the response of the final model is not improved in the search value, dismissing the search value and returning the independent variables to a previous position, inputting a stored optimal value search result to the black box model when a preset search end time is reached, determining a search time at which a response of the black box model is optimal as the optimal search time, and determining the optimal value search result at the optimal search time as a guide.

2. The method of claim 1, wherein the training comprises training the plurality of time series data prediction models a predetermined number of times according to the conditions for the respective models.

3. The method of claim 1, further comprising:
evaluating prediction performance of the final model; and
updating the final model, when the prediction performance of the final model decreases below a predetermined threshold.

4. The method of claim 1, further comprising:
updating the final model according to a predetermined interval.

5. A non-transitory computer-readable recording medium storing a computer program to perform the method of claim 1 in combination with hardware.

6. The method of claim 1, wherein the statistical-based prediction models comprise Least Absolute Shrinkage and Selection Operator (LASSO), Autoregressive Integrated Moving Average (ARIMA), and Extreme Gradient Boosting (XGBoost), and the deep learning-based prediction models comprise Fully Convolutional Network/Convolutional Neural Network (FCN/CNN), Long Short-Term Memory (LSTM), Long Short-Term Memory-Convolutional Neural Network (LSTM-CNN), Spatial Temporal aware Graph Convolutional Neural Network (STGCN), Dual Stage Attention-based Recurrent Neural Network (DA-RNN), and Deep Supervision-based Simple Attention Network (DSANet).

7. A device for predicting, controlling, and describing time series data based on automatic learning, the device comprising:
a hardware processor; and
a memory storing computer-readable instructions executable by the processor,
wherein the processor is configured to:
train a plurality of time series data prediction models according to conditions for the respective models,
determine optimal models among the trained time series prediction models, wherein each of the optimal models meets a predetermined condition,
generate a final model by combining the optimal models,
receive a target variable data for predicting time series data, input the target variable data to the final model, and generate a target variable prediction data corresponding to the target variable data by using the final model,
receive a control variable data, input the control variable data to the final model, and generate a control variable prediction data corresponding to the control variable data by using the final model, wherein the target variable data includes at least one of data of process yield and data of return on investment over time, and the control variable data is data that determines a direction of a change in the target variable prediction data, and
provide a prediction result and a control method for the time series data based on the target variable prediction data and the control variable prediction data,
wherein the plurality of time series data prediction models comprise at least one of statistical-based prediction models and deep learning-based prediction models,
wherein, in providing the prediction result and the control method for the time series data, the processor is configured to:
determine a direction of a change in the target variable data, wherein the direction of the change in the target variable data is determined to indicate an increase of the process yield or the return on investment,
learn control variable data for optimizing the target variable data according to the determined direction of change in the target variable data, and
provide a user with an adjustment direction of the optimized control variable data, and
wherein the adjustment direction of the optimized control variable data includes an optimal value search direction and an optimal search time for the control variable data,
wherein the device further comprises a black box model configured to output a result value corresponding to independent variables that are the control variable data, and
wherein the providing of the user with the adjustment direction of the optimized control variable data comprises:
selecting a moving direction from an origin of the independent variables according to a correlation between the independent variables and a dependent variable that the final model learned, wherein the selecting of the moving direction comprises (1) obtaining a search value by searching the independent variables in an arbitrary direction from the origin, (ii) when a response of the final model is improved in the search value, storing the search value and proceeding with conducting a search for a next optimal value, and (iii) when the response of the final model is not improved in the search value, dismissing the search value and returning the independent variables to a previous position,
inputting a stored optimal value search result to the black box model when a preset search end time is reached,
determining a search time at which a response of the black box model is optimal as the optimal search time, and
determining the optimal value search result at the optimal search time as a guide.

* * * * *